(12) United States Patent
Suciu et al.

(10) Patent No.: US 9,091,210 B2
(45) Date of Patent: Jul. 28, 2015

(54) TEC MOUNT REDUNDANT FASTENING

(75) Inventors: Gabriel L. Suciu, Glastonbury, CT (US); Ioannis Alvanos, West Springfield, MA (US)

(73) Assignee: United Technologies Corporation, Hartford, CT (US)

( * ) Notice: Subject to any disclaimer, the term of this patent is extended or adjusted under 35 U.S.C. 154(b) by 662 days.

(21) Appl. No.: 13/456,436

(22) Filed: Apr. 26, 2012

(65) Prior Publication Data

US 2013/0287565 A1    Oct. 31, 2013

(51) Int. Cl.
*F01D 25/28* (2006.01)
*F02C 7/20* (2006.01)
*B64D 27/26* (2006.01)

(52) U.S. Cl.
CPC . *F02C 7/20* (2013.01); *B64D 27/26* (2013.01); *B64D 2027/264* (2013.01)

(58) Field of Classification Search
CPC .............. F02C 7/20; B64D 2027/264; B64D 2027/266; B64D 2027/262; B64D 2027/268; B64D 27/26
USPC ................ 415/213.1, 214.1; 60/796, 797; 248/554–557, 645; 244/53 R, 54
See application file for complete search history.

(56) References Cited

U.S. PATENT DOCUMENTS

| 3,750,983 | A | * | 8/1973 | Morris | 244/54 |
|---|---|---|---|---|---|
| 3,979,087 | A | * | 9/1976 | Boris et al. | 244/54 |
| 4,555,078 | A | | 11/1985 | Grognard | |
| 5,497,961 | A | * | 3/1996 | Newton | 244/54 |
| 6,516,606 | B2 | | 2/2003 | Fournier et al. | |
| 6,517,027 | B1 | | 2/2003 | Abruzzese | |
| 7,540,157 | B2 | | 6/2009 | Fish | |
| 7,721,546 | B2 | | 5/2010 | Fish et al. | |
| 8,051,664 | B2 | | 11/2011 | Fish | |
| 8,075,261 | B2 | | 12/2011 | Merry et al. | |
| 2006/0277913 | A1 | | 12/2006 | Fish | |
| 2007/0108341 | A1 | * | 5/2007 | Diochon et al. | 244/54 |
| 2009/0189014 | A1 | * | 7/2009 | Balk | 244/54 |
| 2011/0072815 | A1 | * | 3/2011 | Pesiridis et al. | 60/615 |
| 2013/0233997 | A1 | * | 9/2013 | Suciu et al. | 248/554 |

FOREIGN PATENT DOCUMENTS

GB       -2013786 A  *  8/1979  ............... F02C 7/20

OTHER PUBLICATIONS

International Search Report and Written Opinion for related International Application No. PCT/US2013/25022 report dated Apr. 19, 2013.

* cited by examiner

*Primary Examiner* — Christopher Verdier
(74) *Attorney, Agent, or Firm* — Miller, Matthias & Hull LLP

(57) ABSTRACT

A mounting apparatus for a turbine exhaust case (TEC) is provided. The mounting apparatus may include a neck, support links and a plurality of fastening pins. The neck may include an upper portion that is receivable within a pylon associated with the TEC and at least one neck aperture extending therethrough. The support links may downwardly extend from a lower portion of the neck. The support links may be configured to at least partially receive a section of the TEC. Each support link may include at least one link aperture extending therethrough. The fastening pins may include at least one neck pin extending through the neck aperture and at least one link pin extending through the link aperture of each support link.

18 Claims, 4 Drawing Sheets

TEC MOUNT REDUNDANT FASTENING

FIELD OF THE DISCLOSURE

The present disclosure generally relates to mounting assemblies for gas turbine engines, and more particularly, to a mounting apparatus for a turbine exhaust case (TEC) of a gas turbine engine.

BACKGROUND OF THE DISCLOSURE

Gas turbine engines of aircrafts are generally supported and secured below a pylon associated with the aircraft. In order to additionally support the weight of the engine, both while the aircraft is static and in flight, an aft mount structure is typically connected between the aft section of the turbine engine and the associated pylon. In supporting the aft section of the turbine engine, the aft mount aids in withstanding not only gravitational forces but also various forces encountered in flight. Moreover, the aft mount serves to maintain the position of the turbine engine relative to the associated pylon and aircraft in the presence of axial thrust forces caused by operation of the turbine engine as well as any lateral aerodynamic forces introduced during flight.

As shown in FIGS. 1 and 2, however, currently existing aft mounts 2 typically involve a complex arrangement of components, which not only occupies a lot of the space surrounding the turbine engine, but also adds to the overall time and cost associated with manufacturing, assembly and installation. For instance, the aft mount 2 shown may include a mount plate 4 which attaches to a pylon (not shown) associated with the turbine engine 6, a plurality of short links 8 which attach the mount plate 4 to the aft section 10 of the turbine engine 6, and a pair of long thrust links 12 connecting the mount plate 4 to a body of the turbine engine 6. For each additional point of connection between the components within the aft mount, the aft mount is exposed to another area of potential failure and subjected to additional costs. The structure of such aft mounts further make it more difficult to provide any redundancy to each of the points of connection. Furthermore, the size and space occupied by the aft mount limits the space available for other critical components.

Accordingly, there is a need for an improved structure that can be used to mount a gas turbine engine onto a pylon of an aircraft while overcoming the deficiencies of the prior art. More specifically, there is need for a mounting structure which sufficiently aids in supporting a gas turbine engine against axial thrust forces as well as any lateral aerodynamic forces, while reducing the overall space that is occupied by the structure, as well as the overall cost of implementation. There is also need for a more simplified mounting structure which provides for more redundancy and significantly fewer points of potential failures.

SUMMARY OF THE DISCLOSURE

In accordance with one aspect of the disclosure, a mounting apparatus for a turbine exhaust case (TEC) is provided. The mounting apparatus may include a neck, support links and a plurality of fastening pins. The neck may include an upper portion that is receivable within a pylon associated with the TEC and at least one neck aperture extending therethrough. The support links may downwardly extend from a lower portion of the neck, and be configured to at least partially receive a section of the TEC. Each support link may include at least one link aperture extending therethrough. The fastening pins may include at least one neck pin extending through the neck aperture and at least one link pin extending through the link aperture of each support link.

In a refinement, the neck pins may extend through the neck apertures and at least partially through the pylon so as to limit movement of the neck relative to the pylon.

In another refinement, the link pins may extend through the link apertures and at least partially through an outer surface of the TEC so as to limit movement of the TEC relative to the support links.

In another refinement, each support link may provide a slot disposed at an end thereof configured to slidably receive a corresponding guide tab disposed on an outer surface of the TEC. The guide tabs may include apertures configured to align with the link apertures and receive link pins therethrough.

In another refinement, the neck pins may be laterally disposed relative to the TEC to limit substantially axial movement of the TEC.

In another refinement, the link pins may be axially disposed relative to the TEC to limit substantially lateral movement of the TEC.

In another refinement, the neck may include at least two neck apertures configured to receive two or more fastening pins therethrough for redundancy.

In another refinement, each support link may include at least two link apertures configured to receive two or more fastening pins therethrough for redundancy.

In another refinement, the support links may substantially conform to the outer surface of the TEC. The support links may be configured to limit movement of the TEC relative thereto.

In another refinement, the support links may substantially form a semi-circle sized to receive an outer circumference of the TEC. The link apertures and the link pins may be disposed at circumferentially opposing positions of the TEC.

In another refinement, the upper portion of the neck may be substantially frustoconical in shape and configured to be received within a substantially frustoconical recess formed within the pylon.

In yet another refinement, the neck may be rotatable about a vertical axis thereof during operation so as to equalize any forces exerted on the right and left sides thereof.

In accordance with yet another aspect of the disclosure, a mounting assembly for a gas turbine engine is provided. The mounting assembly may include a pylon mount box, a TEC and a yoke disposed between the pylon mount box and the TEC. The yoke may include a neck that is received within the pylon mount box and support links that are coupled to a section of the TEC. The neck may include at least one neck fastening pin coupling the neck of the yoke to the pylon mount box, and each support link may include at least one link fastening pin coupling the TEC to the support link.

In a refinement, an upper portion of the neck may be received within the pylon mount box and include at least one neck aperture sized to receive one or more of the neck fastening pins therethrough. Each support link may downwardly extend from a lower portion of the neck and include at least one link aperture sized to receive one or more of the link fastening pins therethrough.

In another refinement, each support link may provide a slot disposed at an end thereof configured to slidably receive a corresponding guide tab disposed on an outer surface of the TEC. Each of the support links and the guide tabs may include apertures configured to align and receive the link fastening pins therethrough.

In another refinement, the neck fastening pins may be laterally disposed relative to the gas turbine engine to limit substantially axial movement of the TEC.

In another refinement, the link fastening pins may be axially disposed relative to the gas turbine engine to limit substantially lateral movement of the TEC.

In another refinement, the neck may include at least two neck apertures configured to receive two or more fastening pins therethrough for redundancy, and each support link may include at least two link apertures configured to receive two or more fastening pins therethrough for redundancy.

In another refinement, the support links may substantially conform to the outer surface of the TEC. The support links may be configured to limit movement of the TEC relative thereto.

In yet another refinement, the support links may substantially form a semi-circle sized to receive an outer circumference of the TEC. The link fastening pins may be disposed at circumferentially opposing positions of the TEC.

These and other aspects of this disclosure will become more readily apparent upon reading the following detailed description when taken in conjunction with the accompanying drawings.

Figure 1:
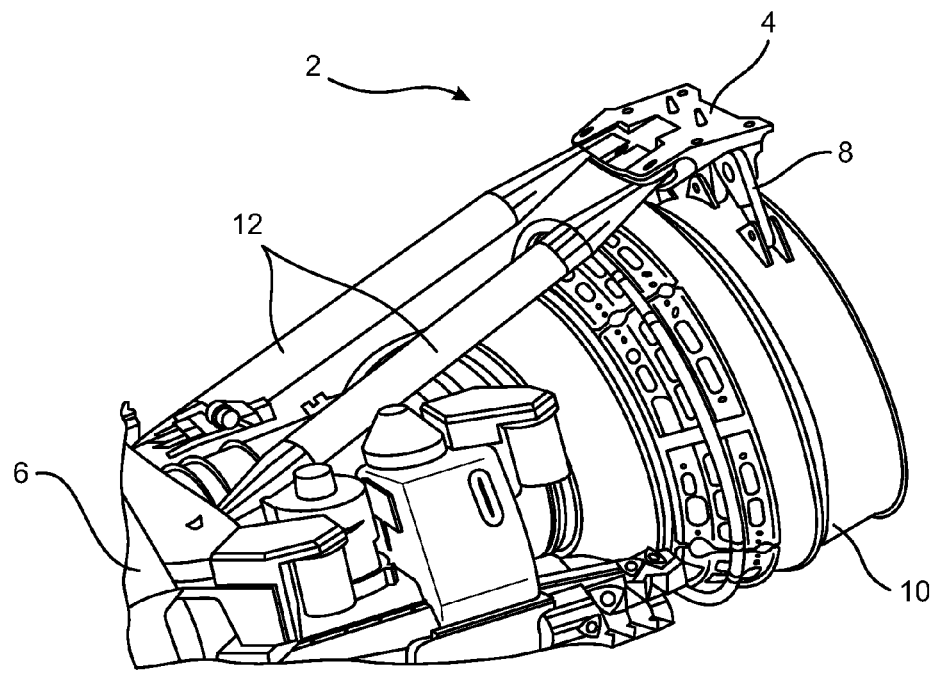
FIG. 1 is a perspective view of an aft mount of the prior art as applied to a gas turbine engine.
Figure 2:
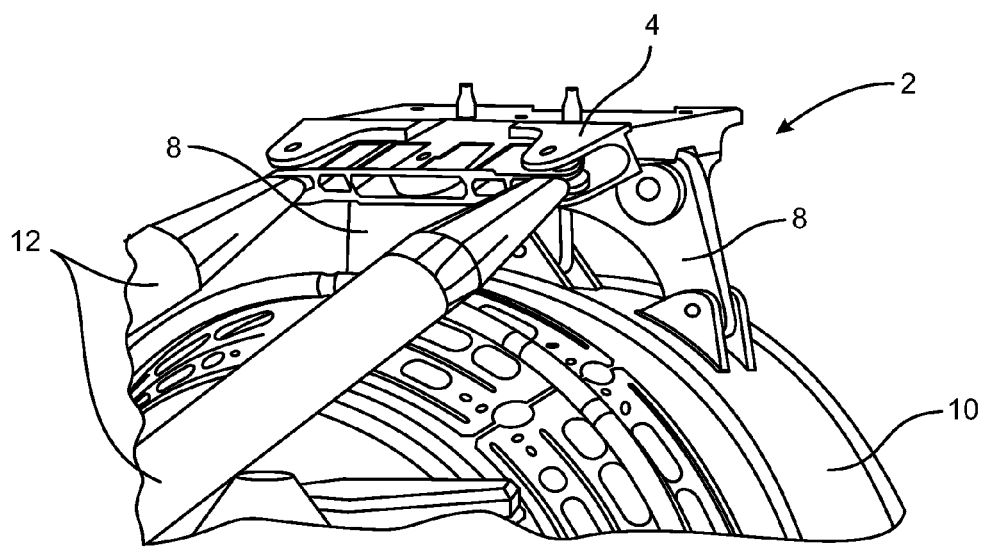
FIG. 2 is another perspective view of the prior art aft mount of FIG. 1.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Figure 3:
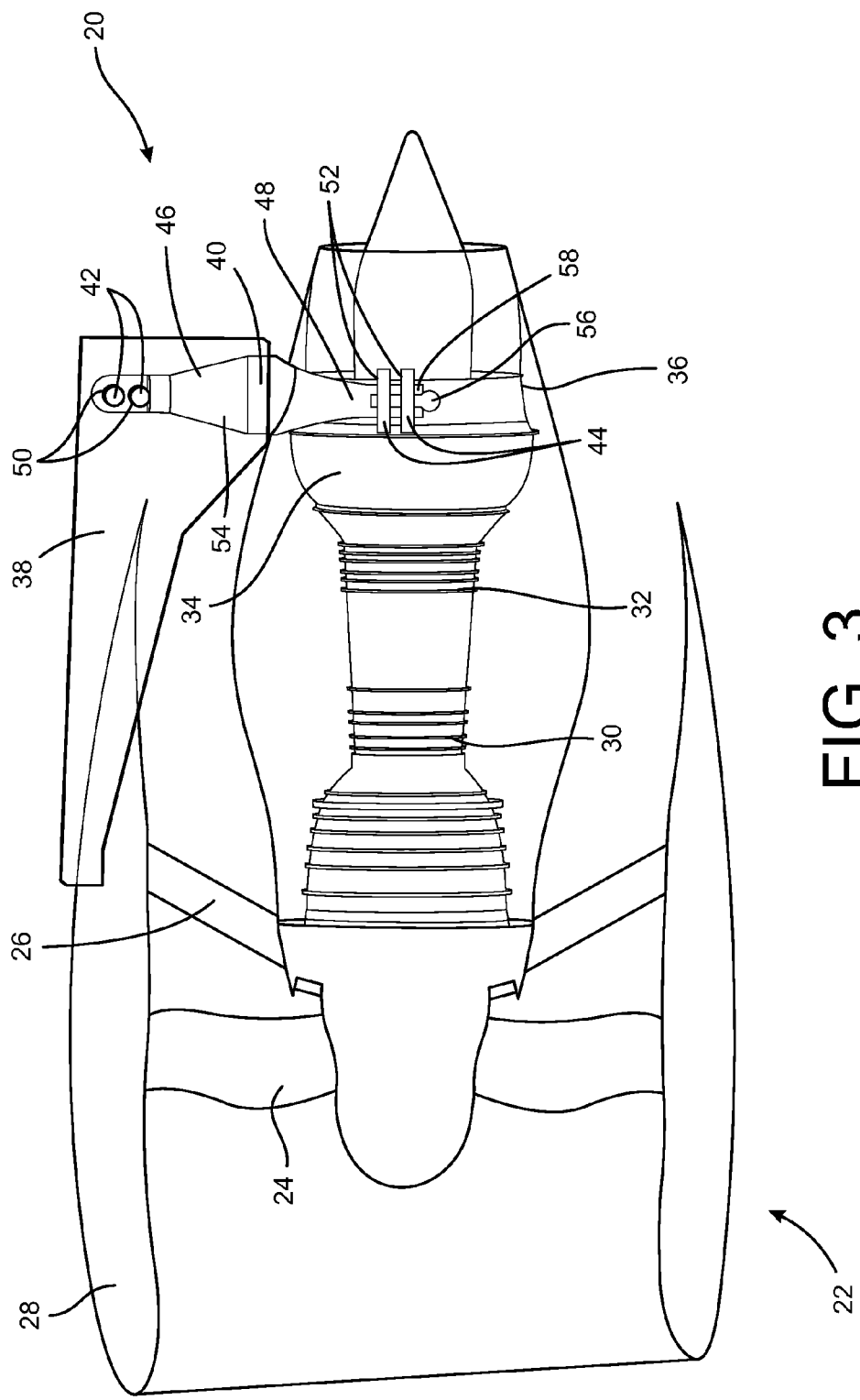
FIG. 3 is a partial, cross-sectional view of one exemplary turbine exhaust case (TEC) mount for a gas turbine engine constructed in accordance with the teachings of the present disclosure.

Referring now to FIG. 3, one exemplary embodiment of a mounting apparatus, or a turbine exhaust case (TEC) mount 20, is shown as applied to a gas turbine engine 22. As with typical gas turbine engine configurations, the fore section of the turbine engine 22 of FIG. 3 may generally include a fan section 24 as well as a plurality of vanes 26 that are radially disposed about a central axis of the turbine engine 22 and at least partially enclosed within a nacelle 28. The turbine engine 22 may also generally include a compressor 30 and a combustor 32 which may lead toward a turbine 34 that is disposed in the aft section of turbine engine 22 and at least partially enclosed within a turbine exhaust case (TEC) 36. The TEC mount 20 of FIG. 3 may be configured to support the aft section of the turbine engine 22 and the TEC 36 from the pylon 38 of the associated aircraft.

Figure 4:
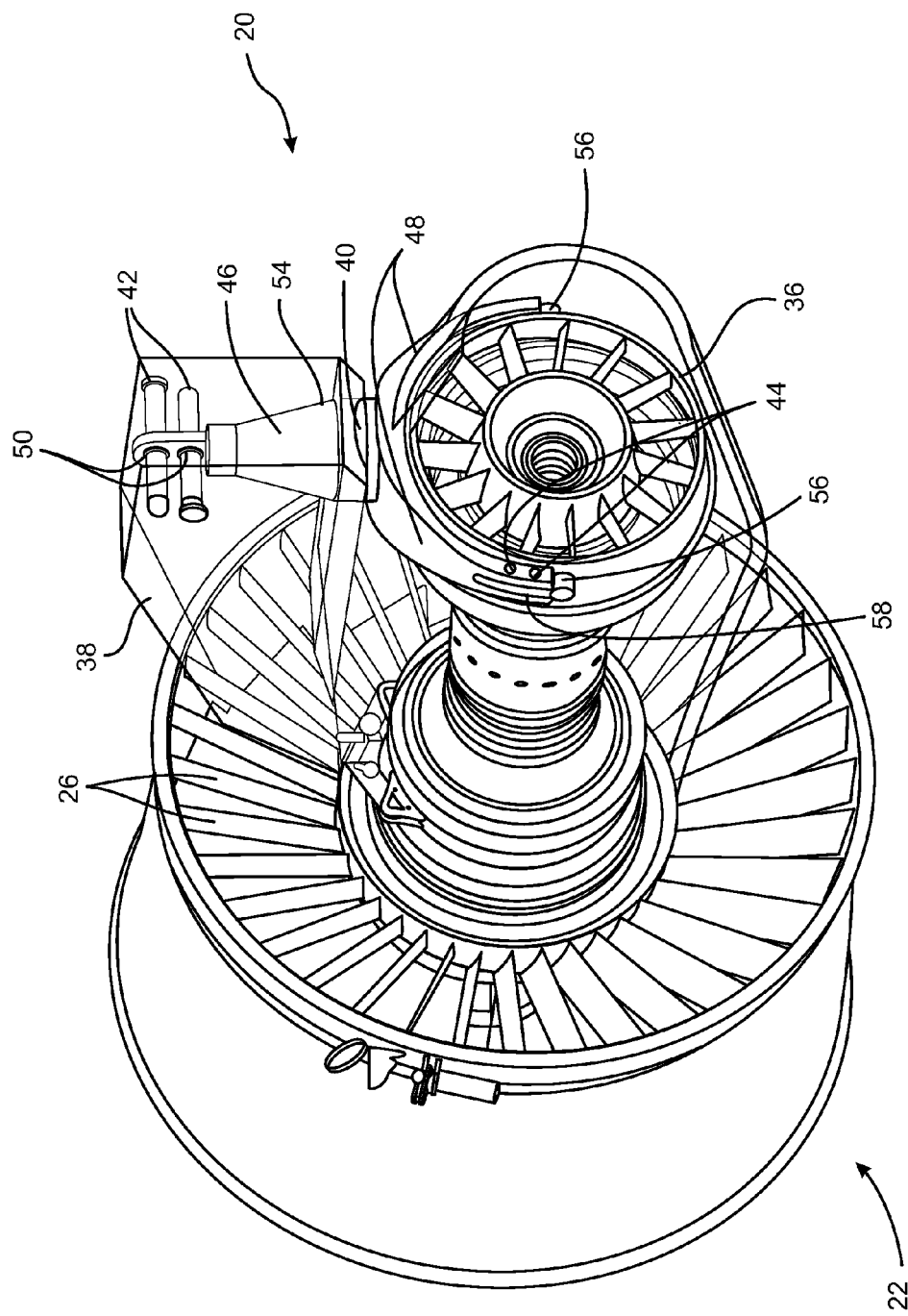
FIG. 4 is a partial, perspective view of another TEC mounting assembly as applied to a gas turbine engine.

Turning to FIG. 4, the TEC mount 20 may be configured to rigidly couple the TEC 36 to the pylon mount box 38 so as to help stabilize the turbine engine 22 and limit axial as well as lateral movement of the TEC 36 relative to the pylon 38 and the associated aircraft. For example, the TEC mount 20 may provide a yoke 40 configured with geometry consistent for partially receiving a section of the TEC 36 and for fitment with the pylon mount box 38. The TEC mount 20 may additionally include a plurality of fastening pins 42, 44, or any other suitable locking mechanism, configured to removably secure particular connecting points of the yoke 40 to each of the TEC 36 and the pylon mount box 38. The yoke 40 may essentially comprise of a neck 46 and support links 48. Specifically, the neck 46 may include an upper portion that is configured to be at least partially received within the pylon mount box 38, as well as a lower portion from which the support links 48 may downwardly extend toward the TEC 36.

Additionally, the upper portion of the neck 46 may be configured with one or more apertures 50 sized to receive one or more of the fastening pins 42 therethrough. As shown in FIG. 4, for example, the neck 46 may provide two separate apertures 50 configured to receive two separate neck pins 42 for redundancy. Moreover, each of the neck pins 42 may be sized and configured such that if either pin 42 fails during operation, the single remaining pin 42 may sufficiently and securely support the TEC 36, at least temporarily. Similarly, the end of each support link 48 may provide one or more apertures 52 sized to receive one or more of the link fastening pins 44 therethrough. For instance, each support link 48 may include two separate apertures 52 configured to receive two separate link pins 44 for redundancy, such that if either pin 44 of one of the support links 48 fails during operation, the remaining pins 44 may still sufficiently maintain a connection with the TEC 36.

Figure 5:
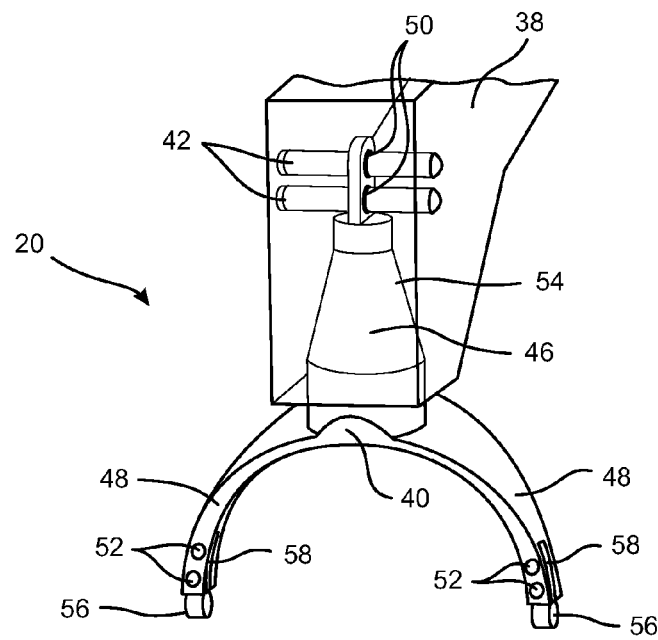
FIG. 5 is a perspective view of another TEC mount shown without the TEC.

As shown in FIG. 5, the geometry of the neck 46 of the TEC mount 20 may be sized and configured to sufficiently support the weight of the TEC 36 and the aft section of the turbine engine 22. The neck 46 may further be designed to be received within and rigidly held in position by the pylon mount box 38. For instance, the neck 46 may be formed to be substantially frustoconical in shape while the pylon mount box 38 may correspondingly provide a substantially frustoconical recess 54 within which the frustoconical neck 46 may be firmly seated. The neck fastening pins 42 may be configured to extend wholly through the neck apertures 50 and at least partially through the body of the pylon mount box 38 so as to upwardly anchor the neck 46 against the inner surface of the pylon recess 54. In general, the combined arrangement of the pylon 38, the neck 46, and the associated neck pins 42 may be such that the yoke 40 does not move forward or rearward within the pylon recess 54 during operation of the aircraft. The yoke 40 may also be configured to be rotatable at least partially about a vertical axis thereof during operation so as to equalize any forces that may be exerted on the right and left sides thereof.

Similarly, the support links 48 may be configured to sufficiently support the weight as well as the size of the corresponding TEC 36 to which it is coupled. More specifically, the support links 48 may be shaped to substantially conform to the outer circumference of the TEC 36. For example, the support links 48 may form a semi-circle, as shown in FIG. 5, so as to secure the link pins 44 to the outer surface of the TEC 36 at circumferentially opposing positions. In alternative modifications, the support links 48 may be varied in length and/or thickness, and configured to secure the link pins 44 to other circumferential positions of the TEC 36. In all modifications, however, the support links 48 may be configured to sufficiently secure the TEC 36 therebetween so as to limit axial as well as lateral movements of the TEC 36 relative to the pylon mount box 38 and the associated aircraft.

Furthermore, the section of the TEC 36 intended to be received between the support links 48 may be fitted with guide tabs 56 that are configured to interlock with the ends of the support links 48, as shown in FIGS. 4 and 5. Moreover, the end of each support link 48 may include a slot 58 sized and configured to slidably receive a guide tab 56 therein. The guide tabs 56 may also be configured with apertures (not shown) which are sized and aligned in accordance with the link apertures 52 such that the link pins 44 may fully extend therethrough. In other modifications, the support links 48 may be configured to engage the outer surface of the TEC 36 using any other locking or interlocking mechanism suited to further secure the connection between the support links 48 and the TEC 36.

Although the embodiments of FIGS. 3-5 may illustrate the TEC mount 20 with two support links 48 and two fastening pins 42, 44 per connection point thereof, it will be understood that other alternatives may exist. For example, the TEC mount 20 may be similarly provided with a single support link that is formed of a unitary body and sized to encircle the circumference of a section of the TEC 36. In other modifications, for example, the TEC mount 20 may provide more than two support links, such as three or four support links, which attach to evenly distributed points on the surface of the TEC 36. In further alternatives, the TEC mount 20 may employ a single fastening pin 42, 44 for each connection point thereof such that, for example, one neck pin 42 and two link pins 44 are employed per TEC mount 20. In still further alternatives, each connection point, or each neck 46 and support link 48, of the TEC mount 20 may employ more than two fastening pins 42, 44 for added redundancy and assurance.

Figure 6:
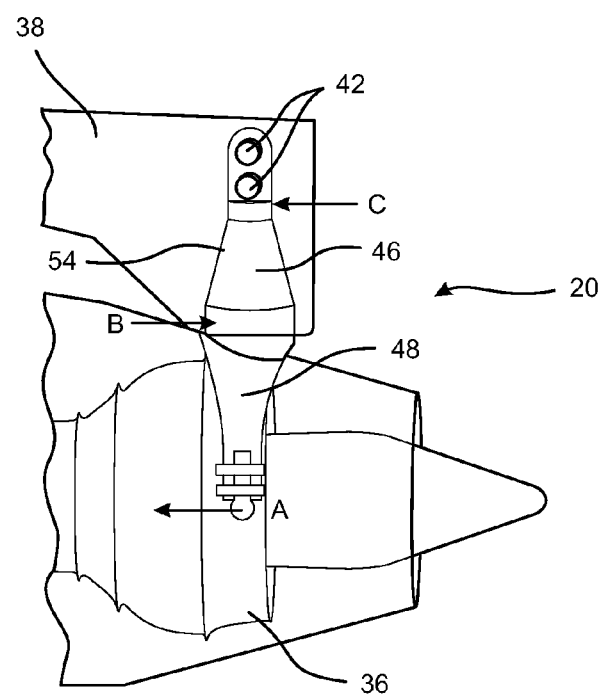
FIG. 6 is a side, plan view of another TEC mounting assembly as applied to a gas turbine engine.

Referring now to FIG. 6, the neck fastening pins 42 as well as the corresponding neck apertures 50 may be laterally disposed relative to the central axis of the turbine engine 22 so as to limit generally axial movements of the TEC 36 and the turbine engine 22 during operation of the aircraft. Additionally, the link fastening pins 44 as well as the corresponding link apertures 52 may be axially disposed relative to the central axis of the turbine engine 22 so as to limit generally lateral movements of the TEC 36 and the turbine engine 22 during flight. The interlocked fitment between the guide tabs 56 and the corresponding slots 58 of the support links 48 may serve to further limit axial movements of the TEC 36. Accordingly, the geometry of the TEC mount 20 and its interaction with the associated pylon mount box 38 may enable sufficient support of the turbine engine 22 and the TEC 36 during operation of the aircraft and in the presence of thrust forces generated by the turbine engine 22.

As shown in FIG. 6, for example, axial thrust forces exerted on the support links 48 during operation of the turbine engine 22, indicated by arrow A, may be counteracted by thrust reaction forces between the TEC mount 20 and the pylon mount box 38, indicated by arrows B and C. More specifically, in response to the thrust forces exerted on the support links 48 in direction A, the pylon mount box 38 may exert a first force on the lower portion of the neck 46 in direction B, and a second force on the upper portion of the neck 46 in direction C. Thrust reaction forces are thus transferred to and distributed through the mounting assembly, such as the TEC mount 20, the pylon mount box 38 and the TEC 36. In such a way, the simplified TEC mount 20 is able to sufficiently manage the thrust forces of an operating turbine engine 22 without requiring structurally complex fixtures as with conventional aft mount arrangements.

Thus, the present disclosure provides a simplified apparatus or assembly for mounting and supporting the aft section of a gas turbine engine. More specifically, the present disclosure provides a mount which couples the TEC of the turbine engine directly to the pylon using a yoke and a plurality of fastening pins. As the present disclosure is integrated more into the existing components of the turbine engine, such as the pylon and the TEC, the disclosed mounting apparatus demands fewer additional components to support the turbine engine. Additionally, the TEC mount connects to each of the pylon and the TEC using simple fastening pins so as to facilitate installation and/or removal thereof without compromising effectiveness. Furthermore, it is easy to implement a redundant set of fastening pins into each point of connection of the disclosed mount for improved reliability.

While only certain embodiments have been set forth, alternatives and modifications will be apparent from the above description to those skilled in the art. These and other alternatives are considered equivalents and within the spirit and scope of this disclosure.

What is claimed is:

1. A mounting apparatus for a turbine exhaust case (TEC), comprising:
    a neck having an upper portion being receivable within a pylon associated with the TEC and having at least one neck aperture extending through the neck;
    support links downwardly extending from a lower portion of the neck, the support links being configured to at least partially receive a section of the TEC, each support link having at least one link aperture extending therethrough;
    a plurality of fastening pins including at least one neck pin extending through the neck aperture and at least one link pin extending through the link aperture of each support link; and
    wherein each support link provides a slot disposed at an end thereof configured to slidably receive a corresponding guide tab disposed on an outer surface of the TEC, the guide tabs having apertures configured to align with the link apertures and receive link pins therethrough.

2. The apparatus of claim 1, wherein the neck pins extend through the neck apertures and at least partially through the pylon so as to limit movement of the neck relative to the pylon.

3. The apparatus of claim 1, wherein the link pins extend through the link apertures and at least partially through an outer surface of the TEC so as to limit movement of the TEC relative to the support links.

4. The apparatus of claim 1, wherein the neck pins are laterally disposed relative to the TEC to limit substantially axial movement of the TEC.

5. The apparatus of claim 1, wherein the link pins are axially disposed relative to the TEC to limit substantially lateral movement of the TEC.

6. The apparatus of claim 1, wherein the neck includes at least two neck apertures configured to receive two or more fastening pins therethrough for redundancy.

7. The apparatus of claim 1, wherein each support link includes at least two link apertures configured to receive two or more fastening pins therethrough for redundancy.

8. The apparatus of claim 1, wherein the support links substantially conform to the outer surface of the TEC, the support links being configured to limit movement of the TEC relative thereto.

9. The apparatus of claim 1, wherein the support links substantially form a semi-circle sized to receive an outer circumference of the TEC, the link apertures and link pins being disposed at circumferentially opposing positions of the TEC.

10. The apparatus of claim 1, wherein the upper portion of the neck is substantially frustoconical in shape and configured to be received within a substantially frustoconical recess formed within the pylon.

11. The apparatus of claim 1, wherein the neck is rotatable about an axis that vertically extends through the neck during operation so as to equalize any forces exerted on the right and left sides of the neck.

12. A mounting assembly for a gas turbine engine, comprising:
   a pylon mount box;
   a turbine exhaust case (TEC);
   a yoke disposed between the pylon mount box and the TEC, the yoke having a neck that is received within the pylon mount box and support links that are coupled to a section of the TEC, the neck including at least one neck fastening pin coupling the neck of the yoke to the pylon mount box, each support link including at least one link fastening pin coupling the TEC to the support link; and
   wherein each support link provides a slot disposed at an end thereof configured to slidably receive a corresponding guide tab disposed on an outer surface of the TEC, each of the support links and the guide tabs having apertures configured to align and receive the link fastening pins therethrough.

13. The assembly of claim 12, wherein an upper portion of the neck is received within the pylon mount box and includes at least one neck aperture sized to receive one or more of the neck fastening pins through the neck aperture, each support link downwardly extending from a lower portion of the neck and having at least one link aperture sized to receive one or more of the link fastening pins therethrough.

14. The assembly of claim 12, wherein the neck fastening pins are laterally disposed relative to the gas turbine engine to limit substantially axial movement of the TEC.

15. The assembly of claim 12, wherein the link fastening pins are axially disposed relative to the gas turbine engine to limit substantially lateral movement of the TEC.

16. The assembly of claim 12, wherein the neck includes at least two neck apertures configured to receive two or more fastening pins therethrough for redundancy, and each support link includes at least two link apertures configured to receive two or more fastening pins therethrough for redundancy.

17. The assembly of claim 12, wherein the support links substantially conform to the outer surface of the TEC, the support links being configured to limit movement of the TEC relative thereto.

18. The assembly of claim 12, wherein the support links substantially form a semi-circle sized to receive an outer circumference of the TEC, the link fastening pins being disposed at circumferentially opposing positions of the TEC.

* * * * *